United States Patent [19]

Bauhof

[11] Patent Number: 4,741,572
[45] Date of Patent: May 3, 1988

[54] SLIDING AUTOMOBILE ROOF COVER HAVING A SHALLOW CONSTRUCTION

[75] Inventor: Karl Bauhof, Weinsberg, Fed. Rep. of Germany

[73] Assignee: Karosseriewerke Weinsberg GmbH, Weinsberg, Fed. Rep. of Germany

[21] Appl. No.: 884,763

[22] Filed: Jul. 11, 1986

[30] Foreign Application Priority Data

Jul. 11, 1985 [DE] Fed. Rep. of Germany ....... 3524840

[51] Int. Cl.⁴ .............................................. B60J 7/05
[52] U.S. Cl. ................................... 296/221; 296/222; 296/223
[58] Field of Search ................. 296/216, 218, 221-223

[56] References Cited

U.S. PATENT DOCUMENTS

| 4,159,144 | 6/1979 | Ehlen ............................. | 296/216 X |
| 4,298,226 | 11/1981 | Mizuma .......................... | 296/220 X |
| 4,624,501 | 11/1986 | Niwa et al. .......................... | 296/222 |

FOREIGN PATENT DOCUMENTS

| 113551 | 7/1984 | European Pat. Off. ............. | 296/222 |
| 3211467 | 10/1982 | Fed. Rep. of Germany ...... | 296/222 |
| 2133460 | 7/1984 | United Kingdom ................ | 296/221 |

*Primary Examiner*—Dennis H. Pedder
*Attorney, Agent, or Firm*—Toren, McGeady & Associates

[57] ABSTRACT

A sliding automobile roof cover characterized by a shallow construction having a rigid cover member which seals an opening in the roof of a vehicle body when in its closed position with the cover member being selectively slidable into an open position uncovering the roof opening or merely into a tilted ventilating position. The sliding cover member is supported by sliding blocks and support arms in guide rails which are subdivided into two guide rail sections movable relative to the plane of the automobile roof substantially perpendicular to the sliding direction of the cover member. Independently of a separation of the dividing lines of the guide rails or merely of the resilient design of single-piece continuous guide rails, an independently actuatable raising and lowering device operates to effect shifting of the position of the guide rail sections relative to the plane of the vehicle roof. The raising and lowering device includes guide links or screw jack drives and particularly, in the case of a single-piece resilient design of the guide rails, two raising and lowering devices are actuated collectively and simultaneously and are arranged on both sides of the rear edge of the roof opening.

12 Claims, 3 Drawing Sheets

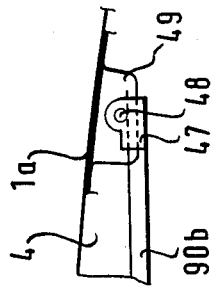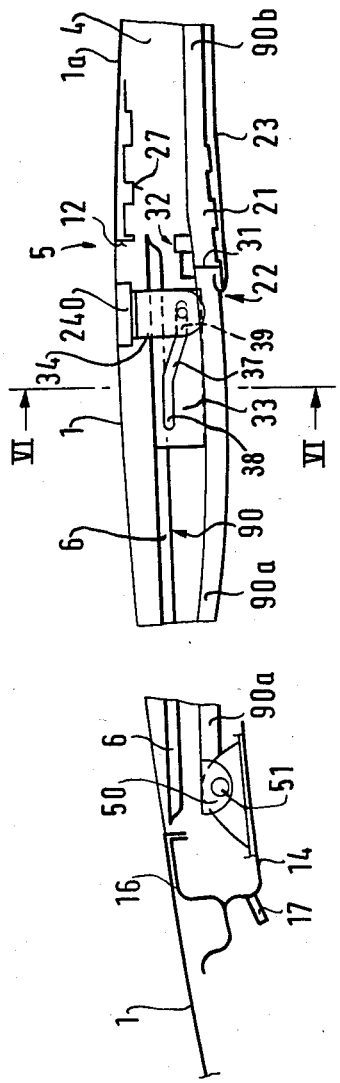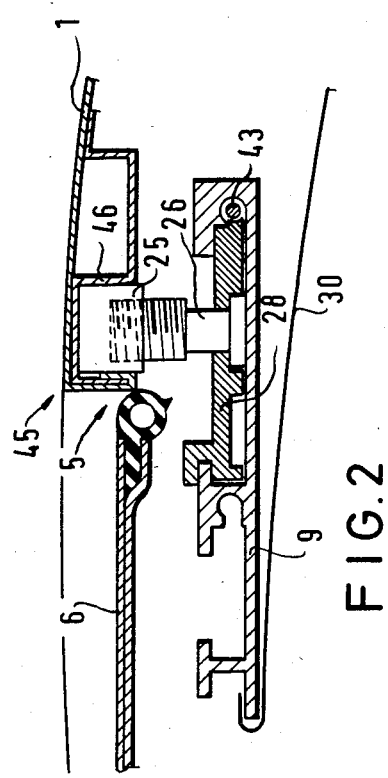

SLIDING AUTOMOBILE ROOF COVER HAVING A SHALLOW CONSTRUCTION

The present invention is directed generally to sliding cover members for the roofs of automotive vehicles commonly known as "sun roofs" and more particularly to a sun roof design having a shallow construction.

The sliding roof top assembly of the present invention operates with a cover member which seals the opening in the vehicle roof when in its closed position and which may be selectively movable into an open position or alternatively into a ventilating position. In the device of the type to which the present invention relates, the cover member or top is supported at the front end by sliding blocks and at its rear end by support arms and additional sliding blocks transversely to the sliding direction of the top within guide rails which are subdivided into two segments connected with each other so as to move together. The guide rail segments are connected at the rigid roof part of the vehicle body, respectively, at their front or rear end so as to be pivotable around an axis oriented transversely to the sliding direction of the top.

In sliding sun roofs utilized in modern motor vehicles, there continuously arises the need for diminishing the overall height of the vehicle, especially due to aerodynamic styling requirements. Additionally, the problem of reduction of the head room in the vehicle arises and in the installation of known and conventional sliding sun roof designs, it becomes increasingly complicated or impossible to avoid reducing the passenger room within the vehicle.

In such vehicles, the installation of a sun roof becomes particularly difficult where a rigid roof top must be capable of being moved beneath the rear portion of the vehicle roof in order to selectively expose an opening in the roof in a position where the opening is either partially or completely exposed. Furthermore, such a sun roof must be capable of being merely raised into an exposed ventilating position.

A particular difficulty in the installation of sliding sun roofs results from the unavoidable pronounced curvature in some types of vehicles which, in a sliding roof top displaceable beneath the rear stationary portion of the vehicle roof, requires a particularly low sliding roof unit, thus reducing to a great extent the head clearance of the vehicle passengers.

SUMMARY OF THE INVENTION

Accordingly, the present invention is directed toward the task of providing a sun roof having a particularly shallow construction, wherein a minimum structural height may be achieved without impairing the head clearance for the vehicle passengers on the one hand and, while, on the other hand, providing the lowest possible fabrication and installation costs. Particularly, the invention is directed toward providing a sun roof design, wherein installation of the sliding roof is possible at least in part as a prefabricated installation kit together with the parts of the roof inner lining of the vehicle body and which, apart from an actuation device of simple design, must also assure a secure water drainage.

In accordance with the invention, the advantages mentioned above are achieved in a sun roof design, wherein guide rail segments are arranged so that they can be brought by means of an actuating device for raising or lowering the sun roof from a first upper position corresponding to a closed position of the roof cover member into a lowered position making possible sliding displacement of the cover member while in its sliding position. In the design in accordance with the present invention, guide rail segments can be constituted either by a separation line subdivision oriented transversely to the sliding direction of the cover member or top or it may, however, simply oy longitudinal areas of not subdivided guide rails which can be elastically bent through transversely to their longitudinal central plane. This design principle enables a sliding roof top at least in its closed position or merely in an exposed ventilating position to reduce the height to the lowest possible value limited essentially to the height of the guide rails and the portion of the construction height of the top. Thus, the principle of design of the invention enables the sliding roof top to be limited to the lowest possible structural height. Accordingly, the design in accordance with the present invention is also particularly suited for installation in so-called coupe versions of passenger motor vehicles since, in this case, the pronounced roof curvature of the vehicle can be utilized for lowering of the guide rails for the purpose that the guide rails essentially extend horizontally in a straight line in the lowered roof top positioned in its displacement position and the sliding roof top can thus be slid below the cavity formed naturally by the roof curvature. By lowering the guide rails for displacement of the sliding roof cover beneath the rear area of the rigid vehicle roof, there indeed results a slight diminution of the head clearance for the vehicle passengers limited only to the case of a complete exposure of the roof cutout by the roof cover member. However, it must be taken into account in this connection that particularly so-called sliding-raising roofs positionable into a ventilating position are only completely opened in very rare instances while, in the course of the predominant life of the vehicle, the sliding roof top either remains completely closed or is merely raised into the ventilating position so that the sliding roof design in accordance with the present invention in fact avoids impairment of the head clearance for the vehicle passengers also in very low coupe versions of vehicles.

Provided that the guide rail segments are constituted by longitudinal areas of continuous guide rails which can be bent resiliently transversely to their horizontal longitudinal central plane, they do not exhibit any precise dividing line and are appropriately arranged in such a way that they are curved upwardly in their elevated position corresponding to the closed position of the sun roof. While in their lowered position corresponding to the lower displacement position of the sun roof, they are curved through toward the bottom relative to their normal position curved through towards the top. There, the through curvature towards the bottom leads to alignment of the guide rails in a straight line in a horizontal plane over their entire length.

It may, however, also be provided that the guide rail segments are subdivided into independent segments along a separation line extending transversely to the sliding direction of the top and that they are coupled with each other as far as their movement is concerned, for example, by a sort of articulated connection.

Irrespective of the manner in which the guide rail segments are individually laid out, it is provided in the present invention that they be capable of being raised or lowered respectively with the parts of the roof inner lining of the vehicle adjacent to the guide rail sections, where the roof inner lining parts on their part consist of prefabricated elements having large areas.

Carriages, sliding blocks and the like, supported in both vertical directions of motion, preferably in their own channel, are assigned to the adjustable raising and lowering devices. In one embodiment of the invention, a guide link comprising at least one slotted recess oriented diagonally to the height to the guide rail in connection with one or several lugs arranged at the stationary roof portion and engaging into the slotted recess is provided at the carriages or sliding blocks. It is evident that the arrangement of guide link and lug can also be designed in reverse.

Independently of the arrangement of the guide link at the rigid roof portion or at the movable carriage or sliding block, the slotted recess of the guide link is provided respectively on both sides of its segment oriented diagonally to the guide rail height with end segments oriented parallel to the longitudinal axis of the guide rail in order to exclude obliquely directed forces at the guide rail segments positioned in their one or other end position. The carriage or sliding block supporting the guide link, or in the case of a reverse arrangement, the engagement part or the lug may be actuated independently from the actuation of the top which can be accomplished either by means of its own actuation organ or, in the case of a temporary decoupling of the drive of the top proper, by the top itself.

The raising and lowering devices may however also be designed in a different manner, for example, they may be formed by one or several jack screw drives fastened at the stationary roof portion and cooperating with a sliding piece or a sliding carriage in the guide rails, wherein an actuating organ, tooth rack or a buckle-proof threaded cable, is assigned to the jack screw drive cooperating with an actuating pinion arranged at one of its parts.

In particular, in the case of one-piece guide rail segments formed by undivided guide rails, it is considered appropriate that the raising or lowering device engages at two points spaced from each other at the guide rails which, however, still lie in the area of the rear edge of the roof opening of the vehicle body. This can be accomplished either by the arrangement of two collectively and simultaneously actuated raising or lowering devices, for example, jack screw drives or by the collective and equally oriented arrangement of recesses in guide links lying consecutively behind each other and the corresponding arrangement of engagement parts, for instance lugs.

In a further embodiment of the invention, a one-piece roof internal lining part is assigned to the two rear guide rail segments connected with each other in a known manner by transverse webs which is connected with said guide rail segments, for example, by means of a plug-in connection to form a homogeneous installation kit. The rear guide rail segments can be connected to the rear transverse web at their rear end by a simply designed plug-in connection possibly secured by means of a screw. There, sprayed-on plastic parts are provided at the rear transverse web which either enable pivotable support of the unit consisting of guide rail segments or guide rails and transverse web in the roof side longitudinal beams of the vehicle body or, however, a pivotably articulated connection of this unit at the rear roof transverse beam or a stiffening traverse of the stationary roof portion. Particularly in the case of short vehicles, it can also be provided that the guide rail segments extend beyond the rear transverse web and on their part are equipped with spray on plastic parts by means of which they are preferably articulated at the rear transverse beam of the vehicle roof. In each case, it is appropriate that pipe-stub-shaped water drainage connections be provided at the sprayed-on plastic parts and are designed to be in one piece with the plastic parts.

The prefabricated roof inner linings arranged on the sides of the roof opening of the vehicle body are coupled with a front guide rail segment as far as their motion is concerned, for which purpose, they are advantageously fastened to be easily installed by means of a plug-in connection, for example, at edge flanges or edge ledges of the guide rail segments. The front portion of the roof internal lining of the vehicle body extending transversely which possibly comprises sun shades, instruments, or the electrical motor for actuation of the sliding roof, is designed together with the units to constitute one piece and is rigidly attached at the stationary roof portion. In connection herewith, the front transverse web which connects the two front guide rail segments with each other is connected rigidly with a part either of the roof stiffening system or of a traverse of the vehicle roof and is connected in an articulated manner by means of sprayed-on plastic parts with the front ends of the front guide rail segments. In this case also the sprayed-on plastic parts are appropriately designed in such a way that they constitute simultaneously a connecting stub for a water drainage hose.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there are illustrated and described the preferred embodiments of the invention.

DESCRIPTION OF THE DRAWINGS

In the drawings:

FIG. 2 is a sectional view taken along the line II—II in FIG. 1 but with the roof lowered for sliding;

FIG. 3 is a longitudinal sectional view taken through another embodiment of the sliding roof assembly of the invention;

FIG. 4 is a longitudinal, sectional view of a rear portion of the embodiment of FIG. 3;

FIG. 5 shows in side view, a magnified detail of a front portion of the embodiment of FIG. 3;

DETAILED DESCRIPTION OF THE PREFERRED EMBODIMENTS

Figure 1:
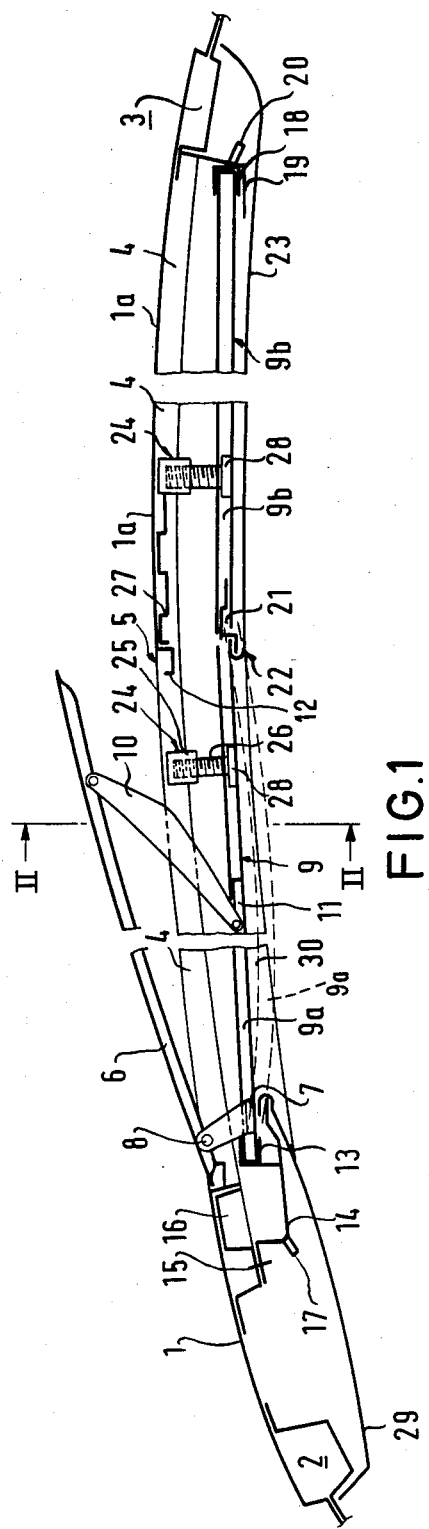
FIG. 1 is a longitudinal sectional view taken through a first embodiment of a sliding roof assembly in accordance with the present invention.

Referring now to the drawings and more particularly to FIGS. 1 and 2, there is schematically illustrated in longitudinal section the roof 1 of a motor vehicle which is essentially constituted of a roof frame including a front transverse beam 2 and a rear transverse beam 3 as well as longitudinal beams 4 extending along side longitudinal edges of the roof. The roof skin of the vehicle roof 1 is provided with a cutout 5 which constitutes an opening in the roof which is peripherally surrounded by roof stiffening means including a front transverse member 16 and a rear transverse member 27 extending transversely to the longitudinal beam 4 of the roof frame of the vehicle resting at the roof skin. The roof opening 5 is arranged to be sealed or closed by a rigid sliding roof top or cover member 6 which is selectively displaceable into a lowered sliding position beneath a rear rigid portion 1a of the vehicle roof 1 or which may merely be raised into an exposed, ventilation position essentially congruent with its sealing position.

The rigid sliding roof top or cover member 6 is supported at the front end in blocks 7 so as to be pivotable around an axis 8 oriented transversely to the driving direction. The sliding blocks are received in guide rails 9 and the rear end of the sliding cover member 6 is supported by support arms 10 at additional sliding blocks 11 which are also displaceably received in guide rails 9. Arms 10 can pivot upwardly, as shown in FIG. 1 to raise the rear end of cover member 6 to a tilted ventilation position.

The guide rails 9 are formed in two segments 9a and 9b which are coupled with each other insofar as their motion is concerned. In the embodiment illustrated in FIGS. 1 and 2, the guide rails are designed in a one-piece overall configuration and so as to be resiliently bendable transversely to their horizontal longitudinal central plane. The rails 9 are bendable in such a way that they exhibit two longitudinal segments forming, respectively, one guide rail segment 9a and 9b, said longitudinal segments being coupled with each other as far as their motion is concerned in the area of the rear edge 12 of the roof opening 5 (see the phantom line in FIG. 1).

In the embodiment illustrated, the guide rails 9 are received with their front ends in a plug-in connection 13 so as to be longitudinally displaceable and pivotable to a small extent, the plug-in connection being arranged in a transverse web 14, with the transverse web 14 connecting the two guide rails 9 with each other and being rigidly connected at 15 at the front traverse of the roof stiffening system.

The transverse web 14 operates simultaneously also as a water collection and drainage device and it is provided with a pipe stub or adapter part 17 for a water drainage hose which is molded therewith or with the plug-in device 13 to form a unitary member. The plug-in device 13 and the adapter stub 17 for the water drainage hose may be made together as a single plastic part sprayed on at the transverse web. The guide rails 9 are also incorporated at the rear end in a plug-in connection which, on its part, is connected with a transverse web 19 by a spraying operation. A pipe-shaped adapter stub 20 for the connection of a water drainage hose is designed to form a unitary member with the plug connection 18. In the area of the rear edge 12 of the roof opening 5, the guide rails 9 are connected with each other by means of a front transverse web 21 at which a roof inner lining 23 is attached by means of a plug-in connection 22. This constitutes the roof inner lining of the rear half of the vehicle in such a way that there results an arrangement involving a kit which is mechanically installed as a unit.

Actuating means in the form of two raising and lowering devices 24 are provided for the guide rails 9 in the embodiment illustrated, which actuating means consist respectively of a jack screw nut 25 and a jack screw 26 which are capable of actuation independently of the top, but collectively by means of an actuating device not shown in the drawing.

The raising and lowering devices 24 are fastened at the longitudinal beam 4 of the roof frame or directly in its vicinity at the roof stiffening device which is located around the roof opening 5. One of the raising and lowering devices is arranged in front of the traverse web 27 of the roof stiffening frame assigned to the rear edge of the roof opening 12 and the other raising and lowering device is arranged behind the traverse web 27.

Sliding carriage means 28 located in the guide rails 9 are connected with the raising and lowering devices 24, with the sliding carriages 28 being supported in both vertical directions of motion in the guide rails 9. The guide rails 9 can be bent resiliently transversely to their horizontal longitudinal center plane and can consist of spring steel material. Appropriately, reinforced plastics or the like may also be used. The rails 9 are inserted into the plug-in receptacles 13 and 18 in such a way that they extend so as to be curved upwardly in their raised position in order to correspond to the relative normal position, and, thus, to the sealed position of the sliding roof top or cover member. While in their lowered position, meaning in the position corresponding to the lowered sliding position of the roof top or cover member, they extend essentially in a horizontal straight line.

A front roof inner lining 29 schematically indicated in the drawing is rigidly installed and connected with the front end of the transverse web 14 by a plug-in connection. The areas 30 of the roof inner lining assigned to the side areas of the roof opening 5 are, on their part, connected by a plug-in connection at the inner edge ledges of the guide rails 9.

In the embodiment illustrated in FIGS. 3–7, guide rails 90 are subdivided into two independent guide rail segments 90a and 90b by a dividing line 31 in the area of the rear edge 12 of the roof opening 5. The two guide rail segments 90a, 90b are coupled with each other insofar as their motion is concerned by a coupling device 32 which is indicated schematically in the drawings. In the embodiment shown, actuating means comprising a raising and lifting device 240 includes a carriage 33 supported in guide rails 90 in both directions of motion as well as a pin 35 (FIG. 6) supported by a carrier 34 at the longitudinal beam 4 of the roof frame of the vehicle body. A guide link 36 is arranged at the carriage 33 and is assigned to the pin 35. The guide link 36 includes a segment 37 which is diagonally oriented relative to the longitudinal direction of the guide rails 90 as well as end segments 38 and 39 oriented horizontally in a straight line.

The guide link 36 is constructed as a unitary member with the carriage 33, which, for its part, is supported at the guide rails 90 in both vertical directions of motion by profile webs 139 and 40 or by the bottom 41 of a guide channel 42 of the guide rails 90. In the embodiment depicted, the carriage 33 together with the guide line 36 is displaceable relative to the stationary lug 35. This is accomplished in such a way that lowering or raising movement of the guide rail 90 occurs if the carriage 33 is actuated in one or the other direction of motion. As illustrated in the drawings, the actuating member of the carriage 33 is constituted by a threaded cable 43 which is placed in an appropriate guide channel 44 of the guide rail 90. The carriage part 34 for the lug 35 is fastened at a portion 46 of the roof stiffening frame extending parallel to the longitudinal edge 45 of the roof opening 5.

Figure 6:
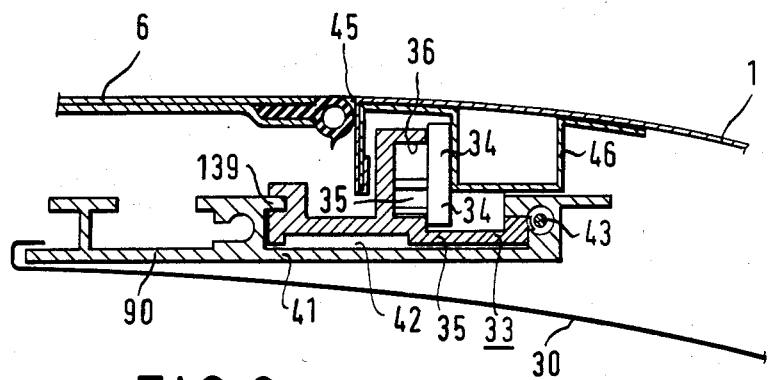
FIG. 6 is a sectional view taken through the line VI—VI in FIG. 3, but with the roof raised.

FIG. 6 shows the position of the guide rails 90 and lug 35 relative to the link 36 in the partially raised position of the sliding top or cover member 6 corresponding to the normal position.

Figure 7:
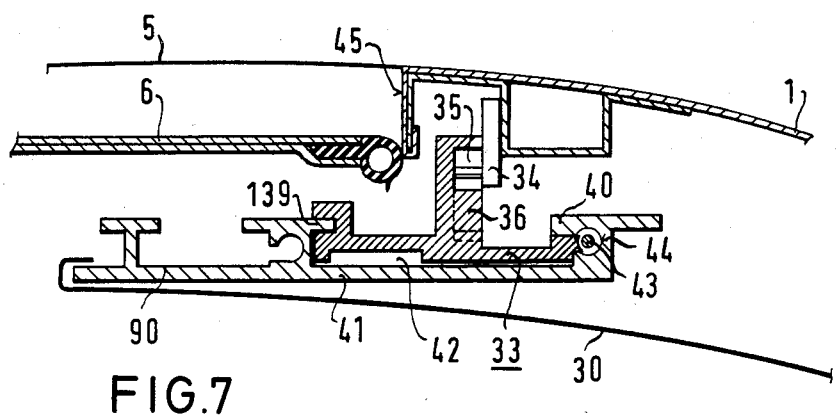
FIG. 7 is a sectional view taken along the line VI—VI in FIG. 3 with the roof lowered as in FIG. 3.

On the other hand, FIG. 7 depicts the relative position of the sliding cover member 6 lowered into its sliding position between guide links 36 and lug 35.

In accordance with FIG. 4, the guide rails may be pivotably articulated at the stiffening traverse web 49 of the vehicle roof 1 at their rear segment 90b by means of a sprayed-on plastic part 47 through a pivot bearing 48.

In accordance with the embodiment illustrated in FIG. 5, the guide rails 90 may be received at the front end of the segments 90a in a sprayed-on plastic part 50 which is supported in a pivotably articulated manner around an axis 51 in the front traverse web 14 and which includes a pipe connection 17 for a water drainage hose.

In the disclosure, parts which are essentially identical are identified and described only once in the different embodiments disclosed. It will be evident that, in the case of an appropriate design, for example, in accordance with the description, the actuating devices including the raising and lowering devices constituted by the jack screw drives may also be replaced by appropriate guide link arrangements. Also, the illustrated arrangement of guide link and engagement parts or lugs can also be arranged in a reverse manner, namely in such a way that the guide link is arranged to be stationary at the stiffening frame of the roof opening and that the engagement lug is arranged on the carriage so as to be displaceable in the guide rail.

Thus, in accordance with the present invention, it will be seen that there is provided a sliding roof assembly or sun roof for motor vehicles which is particularly characterized by a shallow construction. The assembly includes a rigid top or cover member which seals the roof opening of the motor vehicle in its closed position and which is selectively movable into an open position uncovering the roof opening or merely into an exposed ventilating position. The sliding roof top is supported by means of sliding blocks and support arms in guide rails which are subdivided into two guide rail sections movable relative to the plane of the roof transversely to the sliding direction of the cover member. In accordance with the invention, independently of a separation of dividing lines of the guide rails or merely of the resilient design of single-piece continuous guide rails, an independently actuated raising and lowering device is assigned to the shifting of the position of the guide rail segments relative to the roof plane. Here, the raising and lowering device can be constituted by guide links or screw jack drives or the like and particularly in the case of a single-piece resilient design of the guide rails, there may be provided two raising or lowering devices which are actuated collectively, and simultaneously are arranged on both sides of the rear edge of the roof opening.

While specific embodiments of the invention have been shown and described in detail to illustrate the application of the inventive principles, it will be understood that the invention may be embodied otherwise without departing from such principles.

What is claimed is:

1. A sliding roof top assembly having a shallow construction for an automative vehicle, including a vehicle roof having a roof opeing adapted to be sealed by the roof top assembly and a roof frame around the roof opening, the roof top assembly including a cover member mounted in the vehicle roof so as to be slidable in a selected direction and selectively movable from a closed position, sealing the roof opening into an open position uncovering the roof opening and into an upwardly tilted ventilating position above the roof opening, the roof top assembly comprising:

guide rails, each having front and rear portions which are operatively connected to each other for relative angular movement, said front portion being articulated to a front of the roof frame and said rear portion being articulated to a rear of the roof frame;

a lowering device operatively connected between each guide rail and the roof frame for lowering said poritons of each guide rail between the front and rear of the roof frame;

a front sliding block slidably mounted to each guide rail and pivotally connected to the cover member near a front end of the cover member for permitting pivoting of the cover member upwardly into its tilted ventlating position;

a front sliding block slidably mounted to each guide rail;

a support arm pivotally mounted to each rear sliding block, each support arm being articulated to the cover member near a rear end of the cover member; and said cover member being slidable on said front and rear sliding blocks, along said guide rails, when said guide rails are lowered by said lowering device to bring the cover member into its open position, said lowering device being operable when the cover member is below the roof opening to raise said guide rails for bringing the cover member into its closed position, sealing the roof opening.

2. An assembly according to claim 1, wherein said front and rear portions are constituted by a continuous one piece guide rail which is resiliently bent by said lowering device.

3. An assembly according to claim 1, wherein said lowering device comprises a carriage slidably mounted to each of said guide rails, a guide link connected to one of the said carriage and the roof frame said guide link having a recess oriented diagonally to a height of said guide rails and having opposite ends, each with substantially straight end segments extending substantially parallel to the guide rails, and a lug connected to the other of said carriage and the roof frame, said lug sliding in said recess, and an actuating member engaged with said carriage for moving said carriage along its guide rail to lower its guide rail.

4. An assembly according to claim 3, wherein said front and rear portions are constituted by a continuous one piece guide rail which is resiliently bent by said lowering device.

5. An assembly according to claim 4, wherein said lowering device is dedicated only to lowering and raising the guide rail.

6. An assembly according to claim 1, wherein said lowering device comprises a worm drive supported by the roof frame, and a carriage displaceable along each guide rail and engaged by said worm drive, and worm drive dedicated only to lowering and raising the guide rail.

7. An assembly according to claim 1 including plastic plug-in connections connected to the roof frame near the front end of the roof opening, said front portion of said guide rails being plugged into said plug-in connection for articulation to the roof frame, said assembly also forming water drainage means for draining water near the front end of the roof opening.

8. An assembly according to claim 3, wherein said lowering device engages in at least one point at said guide rail located in the area of the rear edge of the roof opening.

9. An assembly according to claim 1, including a roof inner lining connected to one of said rear portions, said rear portions being connected with each other by transverse webs.

10. An assembly according to claim 9, wherein said rear portions are connected to the roof frame by means of a plug-in connection.

11. An assembly according to claim 10, including a rear transverse web connected to the roof frame and carrying said plug-in connection for each rear portion of said guide rails, said plug-in connection being made of plastic material said assembly also forming water drainage means for draining water from said roof frame.

12. An assembly according to claim 11 wherein the roof frame has a front transverse web, a plug-in connection connected to said front transverse web for receiving said front portions of said guide rails, said plug-in connection of said front transverse web having segments of plastic material which constitute said articulation of said front portions, and said assembly forming water drainage means for draining water from said roof frame.

* * * * *